United States Patent
Kim et al.

(10) Patent No.: US 9,490,469 B2
(45) Date of Patent: Nov. 8, 2016

(54) RECHARGEABLE BATTERY HAVING FUSE

(71) Applicant: SAMSUNG SDI CO., LTD., Yongin-si, Gyeonggi-do (KR)

(72) Inventors: Bo-Hyun Kim, Yongin-si (KR); Jong-Ki Lee, Yongin-si (KR); Tae-Sik Kim, Yongin-si (KR); Hyun Soh, Yongin-si (KR); Hyun-Chul Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 203 days.

(21) Appl. No.: 14/301,064

(22) Filed: Jun. 10, 2014

(65) Prior Publication Data
US 2015/0140410 A1 May 21, 2015

(30) Foreign Application Priority Data
Nov. 20, 2013 (KR) .......................... 10-2013-0141613

(51) Int. Cl.
*H01M 2/34* (2006.01)
*H01M 2/26* (2006.01)

(52) U.S. Cl.
CPC ................ *H01M 2/34* (2013.01); *H01M 2/26* (2013.01); *H01M 2200/103* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0177387 A1 | 7/2011 | Byun et al. | |
| 2011/0244280 A1 | 10/2011 | Byun et al. | |
| 2013/0084471 A1* | 4/2013 | Han | H01M 2/043 429/7 |

FOREIGN PATENT DOCUMENTS

| | | |
|---|---|---|
| EP | 2 515 363 A1 | 10/2012 |
| EP | 2 575 189 A1 | 4/2013 |
| EP | 2 662 913 A1 | 11/2013 |
| JP | 2003-197178 | 7/2003 |
| KR | 10-2011-0007785 | 1/2011 |
| KR | 10-2011-0084079 | 7/2011 |
| KR | 10-2011-0109769 | 10/2011 |
| KR | 10-2013-0035163 | 4/2013 |

OTHER PUBLICATIONS

Patent Abstracts of Japan and Machine English Translation of JP 2003-197178 A, 11 Pages.

(Continued)

*Primary Examiner* — Patrick Ryan
*Assistant Examiner* — Wyatt McConnell
(74) *Attorney, Agent, or Firm* — Lewis Roca Rothgerber Christie LLP

(57) ABSTRACT

A rechargeable battery includes: a plurality of electrode assemblies each including first and second electrodes; a case accommodating the electrode assemblies; a cap assembly coupled to the case and including a terminal; and a first current collector coupling the terminal with the first electrodes of the electrode assemblies. The first current collector includes a terminal connector coupled to the terminal and a plurality of electrode connectors, each of the electrode connectors being coupled to a respective one of the first electrodes, and a plurality of first fuses, each of the first fuses being between the terminal connector and a respective one of the electrode connectors and having a substantially constant cross section between the terminal connector and the respective one of the electrode connectors.

15 Claims, 11 Drawing Sheets

(56) References Cited

OTHER PUBLICATIONS

EPO Search Report dated Sep. 10, 2014, for corresponding Chinese Patent application 14167286.5, (9 pages).

KIPO Office Action dated Sep. 5, 2016, for corresponding Korean Patent Application No. 10-2013-0141613 (8 pages).

* cited by examiner

RECHARGEABLE BATTERY HAVING FUSE

CROSS-REFERENCE TO RELATED APPLICATION

This application claims priority to and the benefit of Korean Patent Application No. 10-2013-0141613, filed in the Korean Intellectual Property Office on Nov. 20, 2013, the contents of which are incorporated herein by reference in their entirety.

BACKGROUND

1. Field

Aspects of embodiments of the present invention relate generally to a rechargeable battery.

2. Description of the Related Art

A rechargeable battery differs from a primary battery in that it is designed to be repeatedly charged and discharged, while the latter is not designed to be recharged.

A low-capacity rechargeable battery is used in small portable electronic devices, such as mobile phones, notebook computers, and camcorders, while a high-capacity rechargeable battery is widely used as a power source for driving a motor of a hybrid vehicle and the like.

Recently, a high power rechargeable battery using a non-aqueous electrolyte and having high energy density has been developed, and the high power rechargeable battery is formed by coupling a plurality of rechargeable batteries in series to be used as a power source for driving a motor of a device requiring a large amount of electric power, for example, an electric vehicle and the like.

In addition, a high-capacity battery module generally includes a plurality of rechargeable batteries connected in series, and the rechargeable batteries may be formed in a cylindrical or prismatic shape.

When a short circuit occurs due to internal reasons or contact by external materials and/or objects, an overcurrent flows in the rechargeable battery and/or rechargeable batteries.

When the overcurrent continuously flows, the rechargeable battery may explode or catch fire due to excessive heat generated inside of the rechargeable battery.

The above information disclosed in this Background section is only for enhancement of understanding of the background of the described technology, and therefore, it may contain information that does not form the prior art that is known to a person of ordinary skill in the art.

SUMMARY

Aspects of embodiments of the present invention have been made in an effort to provide a rechargeable battery which is capable of stably cutting off a current when internal and/or external short circuits occur.

A rechargeable battery according to an example embodiment includes: a plurality of electrode assemblies each including a first electrode and a second electrode; a case accommodating the electrode assemblies; a cap assembly coupled to the case and including a terminal; and a first current collector coupling the terminal with the first electrodes of the electrode assemblies, wherein the first current collector includes a terminal connector coupled to the terminal, a plurality of electrode connectors, each of the electrode connectors being coupled to a respective one of the first electrodes, and a plurality of first fuses, each of the first fuses being between the terminal connector and a respective one of the electrode connectors and having a substantially constant cross section between the terminal connector and the respective one of the electrode connectors.

The plurality of first fuses may extend along a length direction of the electrode connectors.

Each of the first fuses may protrude from the terminal connector, and the electrode connectors may extend from the first fuses.

Each of the first fuses may have a cross-section smaller than that of a portion of the first current collector adjacent the first fuses.

The first fuses may include a material having a melting point lower than that of a portion of the first current collector adjacent the first fuses.

The first current collector may further include a second fuse coupling the electrode connectors to each other and may be located between the electrode connectors.

The first fuses and the second fuse may be configured to melt in sequence when an overcurrent flows.

The second fuse may be closer to the electrode connectors than each of the first fuses is to the electrode connectors.

The second fuse may couple the electrode connectors to each other.

The first current collector may further include a third fuse located between the first fuses, the first fuses may be coupled to each other through the third fuse, and each of the first fuses may be closer to the electrode connectors than the third fuse is to the electrode connectors.

The third fuse may extend between the first fuses to couple lateral ends of the first fuses to each other.

The first current collector may further include a plurality of fourth fuses coupled to the terminal connector, and the first fuses may be electrically coupled to the terminal connector through the fourth fuses.

The first fuses may be coupled to the fourth fuses.

The third fuse may have a width smaller than that of each of the first fuses.

Each of the fourth fuses may be coupled to each of the electrode connectors, and each of the fourth fuses may have a width smaller than that of each of the first fuses.

The third fuse and the fourth fuses may be configured to melt before the first fuses when an overcurrent flows.

The first current collector may include a greater number of first fuses than fourth fuses, and each of the fourth fuses may have a width greater than that of each of the first fuses.

The width of each of the fourth fuses may be less than two times the width of each of the first fuses.

A width of the third fuse may be less than the width of each of the first fuses.

A width of the third fuse at a center region of the third fuse may be less than a width of the third fuse outside the center region.

Because the plurality of fuses are coupled (e.g., connected) in series or in parallel, the example embodiment may cut off the current flowing from one electrode assembly to another electrode assembly when the short-circuit occurs.

In addition, it may cut off the current flowing from the electrode assembly to the terminal when the external short-circuit occurs.

DETAILED DESCRIPTION

Figure 1:
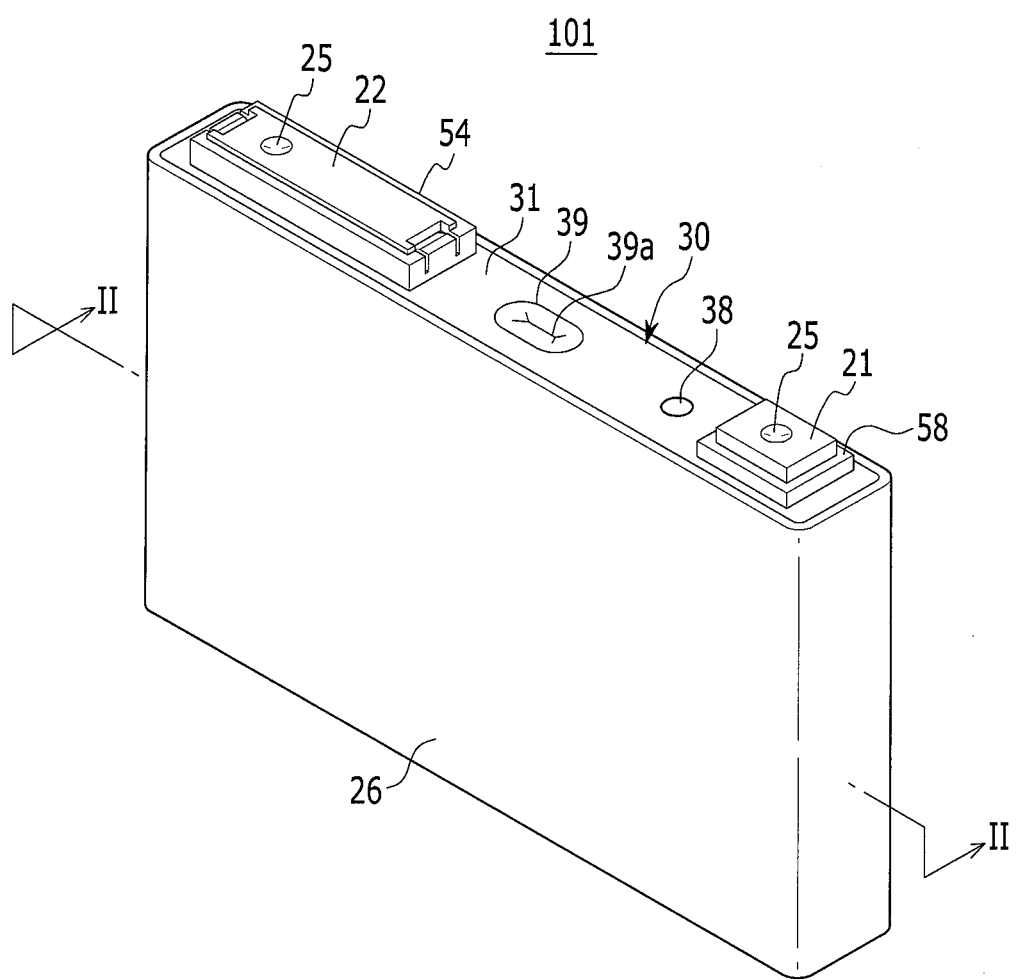
FIG. 1 is a perspective view of a rechargeable battery according to a first example embodiment of the present invention.

The present invention will be described more fully hereinafter with reference to the accompanying drawings, in which example embodiments of the invention are shown.

As those skilled in the art would realize, the described embodiments may be modified in various different ways, all without departing from the spirit or scope of the present invention.

Like reference numerals designate like elements throughout the specification and the drawings. Further, the use of "may" refers to "one or more embodiments of the present invention."

Figure 2:
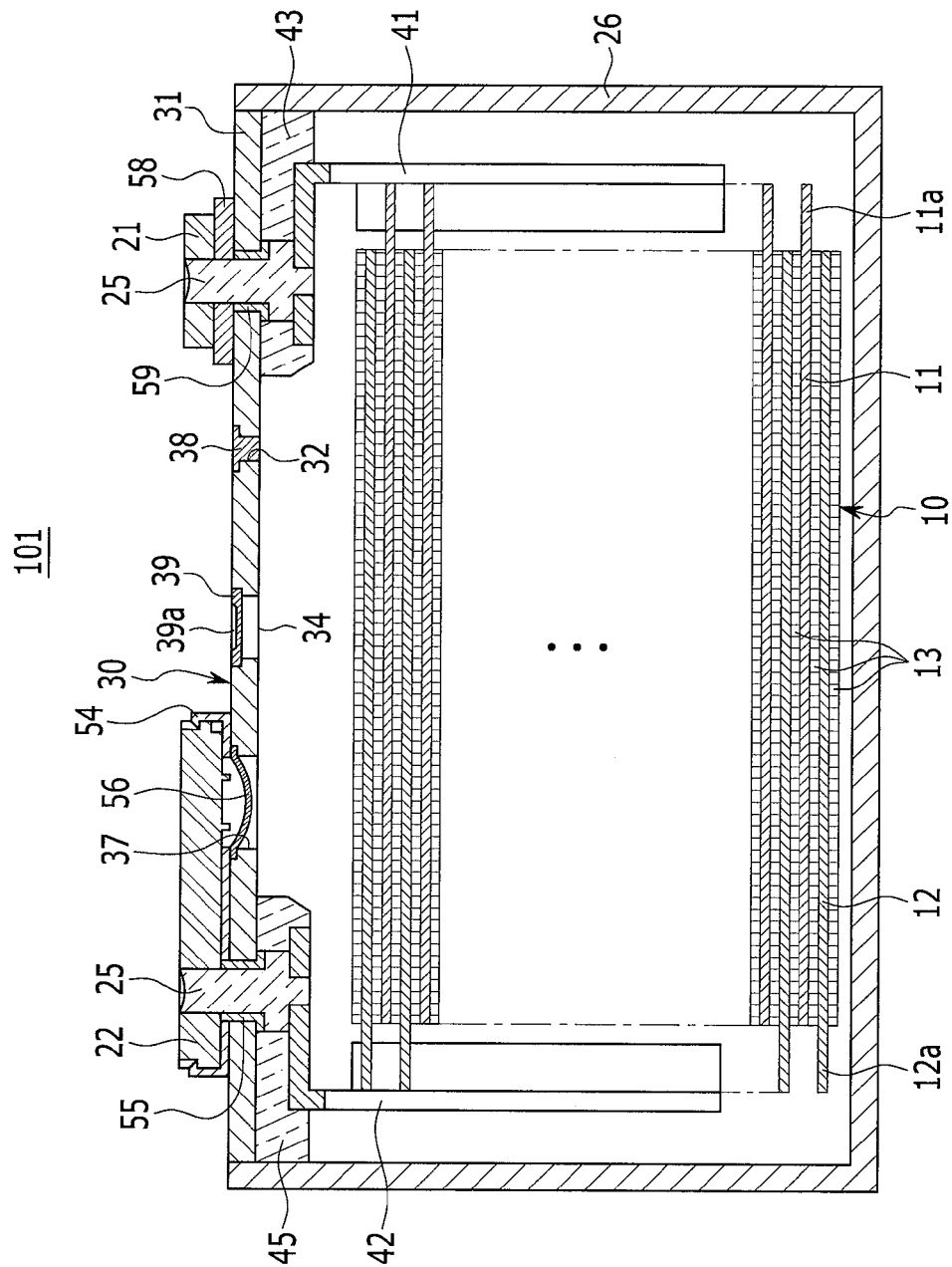
FIG. 2 is a cross-sectional view of FIG. 1 taken along the line II-II.

FIG. 1 is a perspective view of a rechargeable battery according to a first example embodiment of the present invention, and FIG. 2 is a cross-sectional view of FIG. 1 taken along the line II-II.

Referring to FIGS. 1 and 2, the rechargeable battery 101 according to an example embodiment of the present invention includes an electrode assembly 10 formed by winding a positive electrode (e.g., a first electrode) 11 and a negative electrode (e.g., a second electrode) 12 with a separator 13 interposed therebetween, a case 26 in which the electrode assembly 10 is placed (e.g., is accommodated), and a cap assembly 30 combined to (e.g., joined at) an opening in the case 26.

The rechargeable battery 101 according to the present example embodiment is illustrated as a prismatic, lithium ion rechargeable battery as an example.

However, the present invention is not limited thereto, and aspects of embodiments of the present invention can be applied to batteries of various kinds and shapes, such as a lithium polymer battery, a cylindrical battery, and the like.

The positive electrode 11 and the negative electrode 12 each include coated regions where an active material is coated on a current collector formed of a thin metal foil and uncoated regions 11a and 12a where the active material is not coated thereon.

The positive electrode uncoated region 11a is formed at one lateral end of the electrode assembly 10 (e.g., at one lateral end of the positive electrode 11) along a length direction thereof, and the negative electrode uncoated region 12a is formed at the other lateral end of the electrode assembly 10 (e.g., at one lateral end of the negative electrode 12) along the length direction thereof.

The positive electrode 11 and the negative electrode 12 are wound with the separator 13, which operates as an insulator, interposed between them.

However, the present invention is not limited thereto, and the electrode assembly 10 may have a layered structure in which a negative electrode and a positive electrode, respectively formed of a plurality of sheets, are layered with a separator between them.

The case 26 is roughly formed in a shape of a cuboid, and an opening is formed at one side thereof.

The case 26 may be made of a metal, such as aluminum, stainless steel, and the like.

The cap assembly 30 includes a cap plate 31 covering the opening of the case 26, a first terminal 21 protruding out of the cap plate 31 and electrically coupled to (e.g., electrically connected to) the positive electrode 11, and a second terminal 22 protruding out of the cap plate 31 and electrically coupled to the negative electrode 12.

The cap plate 31 is formed in an elongated plate shape extending in one direction and is combined to (e.g., joined at) the opening of the case 26.

The cap plate 31 includes a sealing cap 38 provided in (e.g., sealing) an electrolyte injection opening 32 and a vent plate 39 which is provided in a vent opening 34 (e.g., a vent hole) and is formed with a notch 39a set to be opened at a reference pressure (e.g., a predetermined pressure).

The first and second terminals 21 and 22 are provided to protrude upwards from the cap plate 31.

The first terminal 21 is electrically coupled to the positive electrode 11 through a first current collecting member 41, and the second terminal 22 is electrically coupled to the negative electrode 12 through a second current collecting member 42.

However, the present invention is not limited thereto, and the first terminal 21 may be electrically coupled to the negative electrode, while the second terminal 22 may be electrically coupled to the positive electrode.

The first terminal 21 has a rectangular plate shape.

The first terminal 21 is electrically coupled to the positive electrode 11 through a connecting terminal 25 coupled to (e.g., bonded to) the first current collecting member 41.

The connecting terminal 25 combined with (e.g., joined with) the first terminal 21 has the same or substantially the same structure as the connecting terminal 25 combined with the second terminal 22.

A sealing gasket 59 for sealing is provided between the connecting terminal 25 and the cap plate 31 to be inserted into an opening (e.g., a hole) in the cap plate 31 that the connecting terminal 25 penetrates, and a lower insulation member 43 is provided under the cap plate 31 to support the current collecting member 41 from above.

A connection member 58 electrically coupling the first terminal 21 and the cap plate 31 is provided under the first terminal 21.

Accordingly, the cap plate 31 and the case 26 are coupled to the positive electrode 11.

The second terminal 22 has a rectangular plate shape.

The second terminal 22 is electrically coupled to the negative electrode 12 through the connecting terminal 25 which is coupled to (e.g., bonded to) the second current collecting member 42.

The connecting terminal 25 penetrates through (e.g., extends through) the cap plate 31 and the second terminal 22 such that its upper part is fixed to the second terminal 22.

A sealing gasket 55 for sealing is provided between the second terminal 22 and the cap plate 31 to be inserted into an opening (e.g., a hole) in the cap plate 31 that the second terminal 22 penetrates, and a lower insulation member 45 is provided under the cap plate 31 to insulate the second terminal 22 from the second current collecting member 42 at the cap plate 31.

A short-circuit protrusion is formed to protrude towards a short-circuit opening 37 (e.g., a short circuit hole) at a bottom side of the second terminal 22.

The second terminal 22 is formed to be elongated in one direction to cover the short-circuit opening 37.

An upper insulation member 54 is provided between the second terminal 22 and the cap plate 31 to electrically insulate them from each other.

Because the cap assembly 30 includes a short-circuit member 56 which short-circuits the positive electrode 11 and the negative electrode 12, the short-circuit member 56 is electrically coupled to the cap plate 31 and deforms to be connected to the second terminal 22 when internal pressure of the rechargeable battery 101 increases.

The short-circuit opening 37 is formed in the cap plate 31, and the short-circuit member 56 is disposed between the upper insulation member 54 and the cap plate 31 in the short-circuit opening 37.

The short-circuit member 56 includes a curved portion which is convexly curved downwards in an arc shape and an edge portion which is formed outside of (e.g., which surrounds) the curved portion and is fixed to the cap plate 31.

When gas is generated by an abnormal reaction inside the rechargeable battery 101, internal pressure of the rechargeable battery 101 increases.

The curved portion of the short-circuit member 56 deforms to be convexly curved upwards when internal pressure of the rechargeable battery 101 exceeds a reference level (e.g., a predetermined level), and in this case, the short-circuit protrusion contacts the short-circuit member 56 to cause a short circuit.

Figure 3:
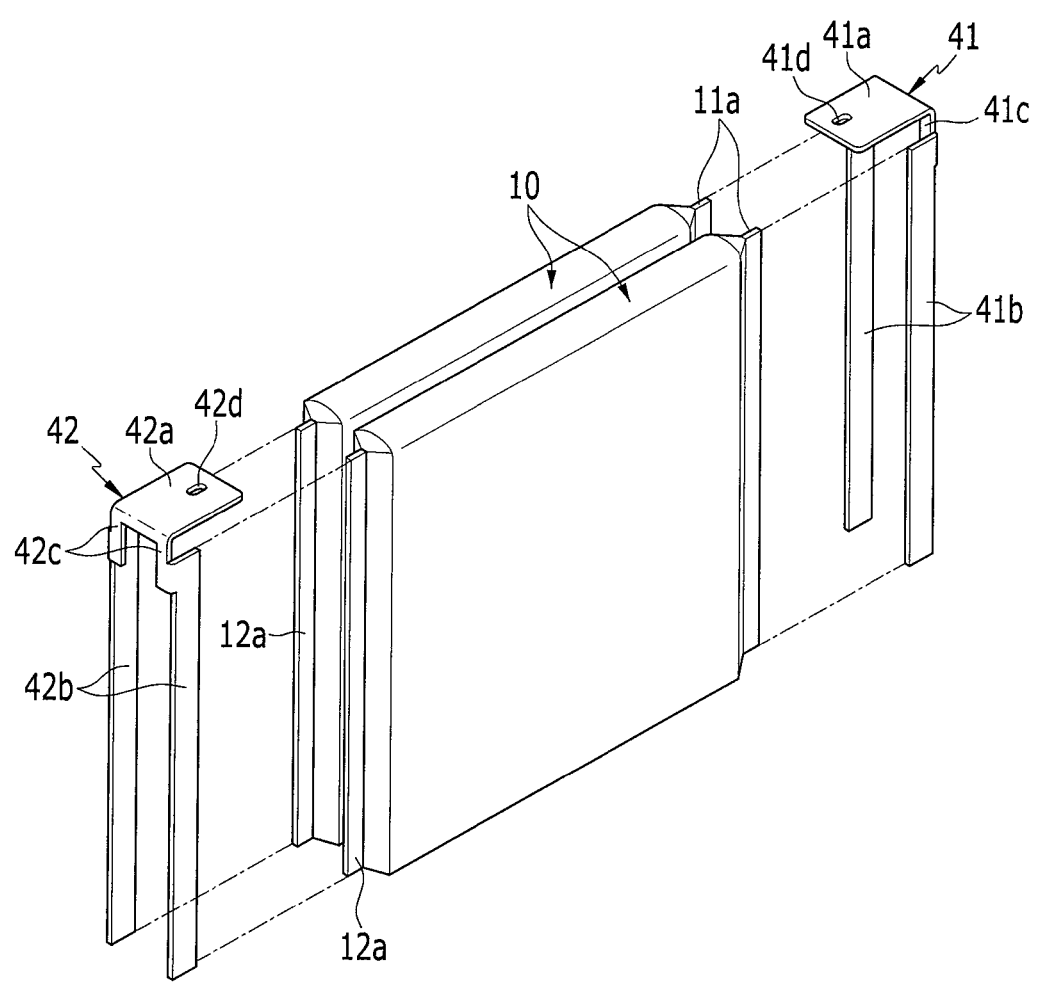
FIG. 3 is an exploded perspective view of electrode assemblies and current collecting members according to the first example embodiment of the present invention.
Figure 4:
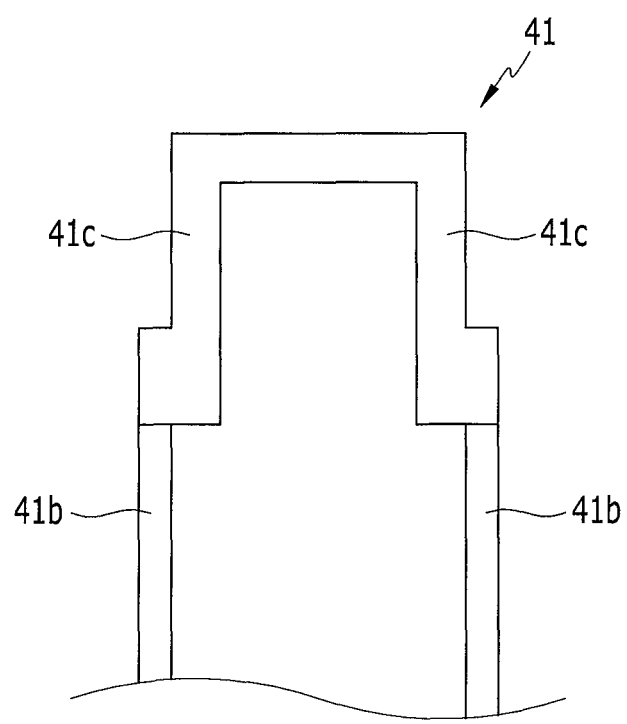
FIG. 4 is a side view of a first current collecting member according to the first example embodiment of the present invention.

FIG. 3 is an exploded perspective view of electrode assemblies and current collecting members according to the first example embodiment of the present invention, and FIG. 4 is a side view of a first current collecting member according to the first example embodiment of the present invention.

Referring to FIGS. 3 and 4, the first current collecting member 41 includes a terminal connection portion 41a coupled to (e.g., bonded to) the connecting terminal 25 and electrode connection portions 41b extending from the terminal connection portion 41a towards a bottom of the case 26.

The terminal connection portion 41a has a quadrangular plate shape and is coupled to (e.g., fixed to) a bottom side of the connecting terminal 25 by, for example, welding.

A fastening opening 41d (e.g., a fastening hole) is formed in the terminal connection portion 41a, and the terminal connection portion 41a is welded to the connecting terminal 25 while a protrusion formed at the bottom of the connecting terminal 25 is inserted into (e.g., fitted into) the fastening opening 41d.

Two electrode assemblies 10 are inserted into the case 26 to be disposed in parallel with each other, and the first current collecting member 41 is provided with two electrode connection portions 41b.

Each of the electrode connection portions 41b is bent from a first fuse portion 41c to be coupled to (e.g., bonded to) the positive electrode uncoated region 11a while being disposed in parallel therewith.

The electrode connection portions 41b are respectively coupled to the positive electrode uncoated regions 11a of the different electrode assemblies 10 by, for example, welding.

The first fuse portions 41c are formed between the electrode connection portion 41b and the terminal connection portion 41a such that they are melted faster (e.g., are melted or become disconnected in a shorter amount of time) than respective peripheral regions when an overcurrent flows.

The first fuse portions 41c are bent from the terminal connection portion 41a to protrude towards the bottom of the case 26.

The two first fuse portions 41c are formed at the terminal connection portion 41a, and the first fuse portions 41c have smaller cross-sections than the respective peripheral regions.

The electrode connection portions 41b are coupled to the terminal connection portion 41a through the first fuse portions 41c, and each of the first fuse portions 41c is coupled to each of the electrode connection portions 41b. The first fuse portions 41c have a substantially constant cross section between the terminal connection portion 41a and respective ones of the electrode connection portions 41b.

The first fuse portions 41c are disposed in series with (e.g., in line with) the electrode connection portions 41b. The first fuse portions 41c extend along a length direction of the electrode connection portions 41b.

A second current collecting member 42 includes a terminal connection portion 42a coupled to (e.g., bonded to) the connecting terminal 25 and electrode connection portions 42b extending from the terminal connection portion 42a towards the bottom of the case 26.

A fastening opening 42d (e.g., a fastening hole) is formed in the terminal connection portion 42a, and the terminal connection portion is coupled to (e.g., bonded to) the connecting terminal 25 by, for example, welding while a protrusion formed at a bottom of the connecting terminal 25 is inserted into (e.g., fitted into) the fastening opening 42d.

The electrode connection portions 42b are bent from first fuse portions 42c to be coupled to (e.g., bonded to) the negative electrode uncoated region 12a by, for example, welding while being disposed in parallel therewith.

The electrode connection portions 42b are respectively coupled to the negative electrode uncoated regions 12a of the different electrode assemblies 10 by, for example, welding.

The first fuse portions 42c are formed between the electrode connection portions 42b and the terminal connection portion 42a such that they are melted faster (e.g., melt or become disconnected in a shorter amount of time) than respective peripheral regions when an overcurrent flows.

The first fuse portions 42c are formed to have a smaller cross-section than the respective peripheral regions, and the electrode connection portions 42b are coupled to the terminal connection portion 42a through the first fuse portions 42c.

When an internal short-circuit occurs in one of the electrode assemblies 10, short-circuit current flows from the other electrode assembly 10 to the short-circuited electrode assembly 10.

The short-circuit current flows through the electrode connection portions 41b and 42b and the first fuse portions 41c and 42c, and the first fuse portions 41c and 42c are melted when the short-circuit current flows, thereby cutting off the short-circuit current.

In addition, when an external short-circuit occurs due to, for example, the deformed short-circuit member 56 (e.g., when the short-circuit member 56 deforms), a short-circuit current flows from each of the electrode assemblies 10 to the terminals 21 and 22, and the short-circuit current flows to the terminals 21 and 22 through the first fuse portions 41c and 42c.

Accordingly, the first fuse portions 41c and 42c may cut off the short-circuit current by melting when the short-circuit current flows.

Figure 5:
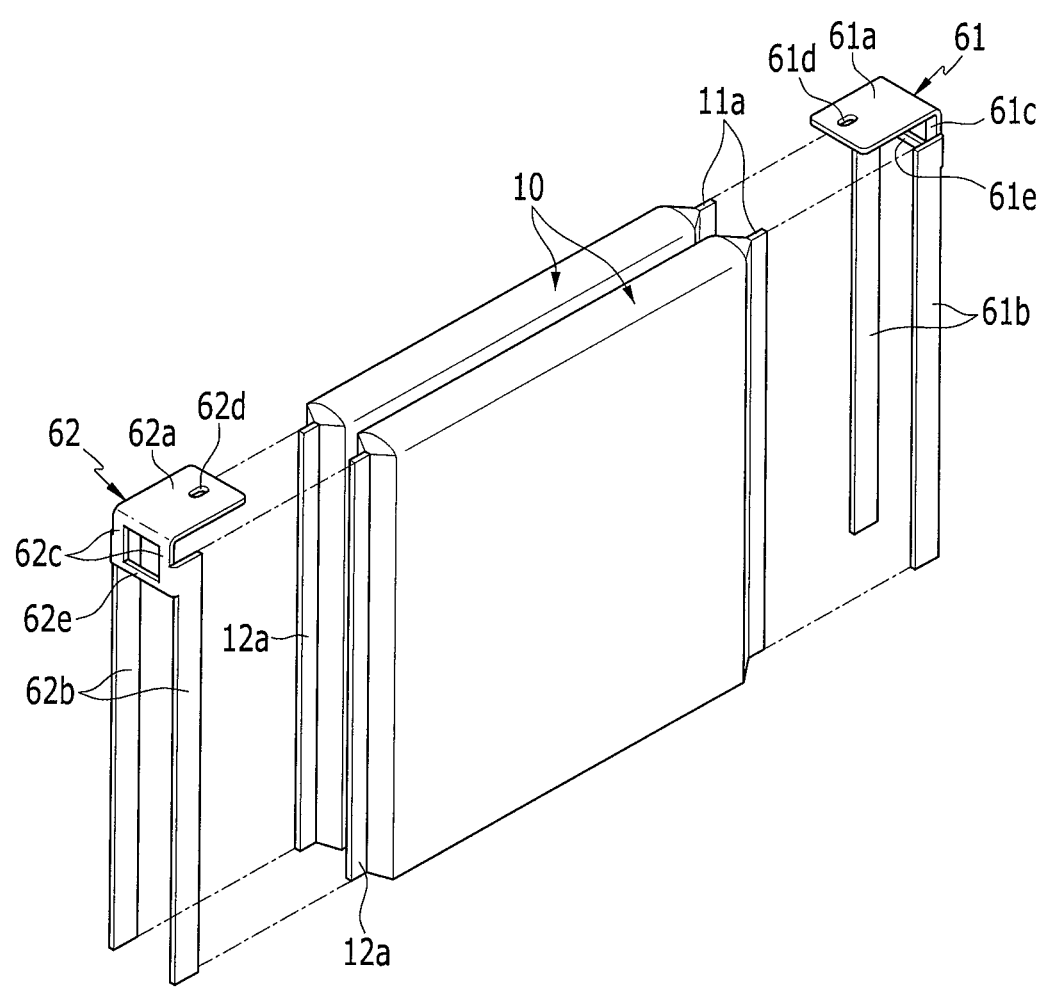
FIG. 5 is an exploded perspective view of electrode assemblies and current collecting members according to a second example embodiment of the present invention.
Figure 6:
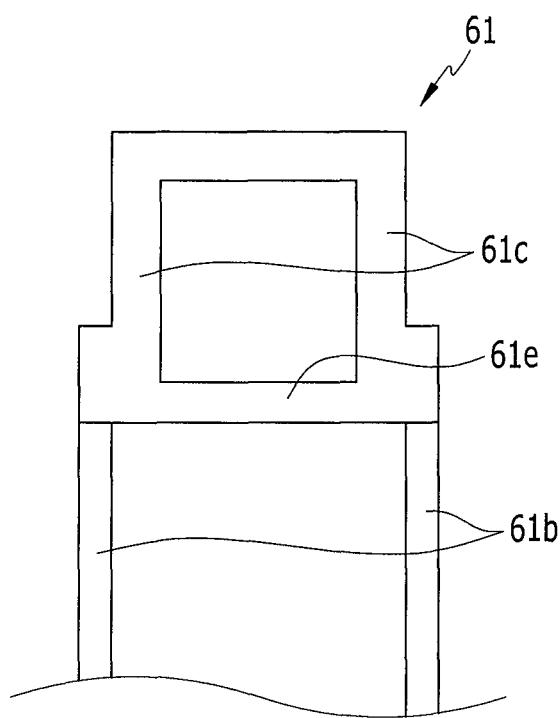
FIG. 6 is a side view of a first current collecting member according to the second example embodiment of the present invention.

FIG. 5 is an exploded perspective view of electrode assemblies and current collecting members according to a second example embodiment of the present invention, and FIG. 6 is a side view of a first current collecting member according to the second example embodiment of the present invention.

Referring to FIGS. 5 and 6, because a rechargeable battery according to the present example embodiment has the same or substantially the same structure as the first example embodiment described above, except for a structure of first and second current collecting members 61 and 62, a repeated description of the structure may be omitted.

The first current collecting member 61 includes a terminal connection portion 61a coupled to (e.g., bonded to) the connecting terminal 25 and electrode connection portions 61b extending from the terminal connection portion 61a towards the bottom of the case 26.

The terminal connection portion 61a has a quadrangular plate shape and is coupled to (e.g., fixed to) the bottom of the connecting terminal 25 by, for example, welding.

A fastening opening 61d (e.g., a fastening hole) is formed in the terminal connection portion 61a, and the terminal connection portion 61a is welded to the connecting terminal 25 while the protrusion formed at the bottom of the connecting terminal 25 is inserted into (e.g., fitted into) the fastening opening 61d.

Two electrode assemblies 10 are disposed in parallel with each other in the case 26, and the first current collecting member 61 is provided with two electrode connection portions 61b.

The electrode connection portions 61b are bent from first fuse portions 61c and are coupled to (e.g., bonded to) the positive electrode uncoated region 11a while being disposed in parallel therewith.

The electrode connection portions 61b are respectively coupled to (e.g., bonded to) the positive electrode uncoated regions 11a of the different electrode assemblies 10 by, for example, welding.

The first fuse portions 61c are formed between the electrode connection portions 61b and the terminal connection portion 61a such that they are melted faster than respective peripheral regions when an overcurrent flows.

The first fuse portions 61c are bent from the terminal connection portion 61a to protrude toward the bottom of the case 26.

The two first fuse portions 61c are formed at the terminal connection portion 61a, and the first fuse portions 61c have smaller cross-sections than the respective peripheral regions.

The electrode connection portions 61b are coupled to the terminal connection portion 61a through the first fuse portions 61c, and each of the first fuse portions 61c is coupled to each of the electrode connection portions 61b.

The first fuse portions 61c are disposed in series with (e.g., in line with) the electrode connection portions 61b.

A second fuse portion 61e is formed between (e.g., extends between) the electrode connection portions 61b to directly couple (e.g., directly connect) the electrode connection portions 61b to each other.

Opposite ends (e.g., lateral ends) of the second fuse portion 61e are respectively coupled to the electrode connection portions 61b.

The second fuse portion 61e has a smaller cross-section than a peripheral region such that it is melted faster than its peripheral region when an overcurrent flows.

The second fuse portion 61e is disposed closer to the electrode connection portions 61b than the first fuse portion 61c is, and the electrode connection portions 61b are coupled in parallel with each other through the second fuse portion 61e.

A second current collecting member 62 includes a terminal connection portion 62a coupled to (e.g., bonded to) the connecting terminal 25 and electrode connection portions 62b extending from the terminal connection portion 62a towards the bottom of the case 26.

A fastening opening 62d (e.g., a fastening hole) is formed at the terminal connection portion 62a, and the terminal connection portion 62a is welded to the connecting terminal 25 while the protrusion formed at the bottom of the connecting terminal 25 is inserted into (e.g., fitted into) the fastening opening 62d.

The electrode connection portions 62b are bent from a first fuse portion 62c to be coupled to (e.g., bonded to) the negative electrode uncoated region 12a while being disposed in parallel therewith.

The electrode connection portions 62b are respectively coupled to (e.g., bonded to) the negative electrode uncoated regions 12a of the different electrode assemblies 10 by, for example, welding.

The first fuse portions 62c are formed between the electrode connection portions 62b and the terminal connection portion 62a such that they are melted faster than respective peripheral regions when an overcurrent flows.

The first fuse portions 62c are formed to have a smaller cross-section than the respective peripheral regions, and the electrode connection portions 62b are coupled to the terminal connection portion 62a through the first fuse portions 62c.

A second fuse portion 62e is formed between (e.g., extends between) the electrode connection portions 62b to directly couple (e.g., directly connect) the electrode connection portions 62b to each other.

The second fuse portion 62e is coupled to respective lateral ends of the electrode connection portions 62b such that it is disposed to cross the electrode connection portions 62b.

The second fuse portion 62e has a smaller cross-section such that it is melted faster than a periphery region when an overcurrent flows.

The second fuse portion 62e is disposed closer to the electrode connection portions 62b than the first fuse portions 62c is.

When an internal short-circuit occurs in one of the electrode assemblies 10, a short-circuit current flows from the other electrode assembly 10 to the short-circuited electrode assembly 10.

The short-circuit current flows from the electrode connection portions 61b and 62b to the second fuse portions 61e and 62e, and the second fuse portions 61c and 62c are melted when the short-circuit current flows.

After the second fuse portions 61e and 62e are melted, the short-circuit current flows from the electrode connection portions 61b and 62b to the first fuse portions 61c and 62c, and in this case, the first fuse portions 61c and 62c are melted.

Accordingly, when the second fuse portions 61e and 62e are formed, the fuse portions are melted in sequence to reduce arc generation when the short-circuit occurs.

In addition, structural stability of the current collecting member is improved as the second fuse portions 61e and 62e support the first fuse portions 61c and 62c.

Figure 7:
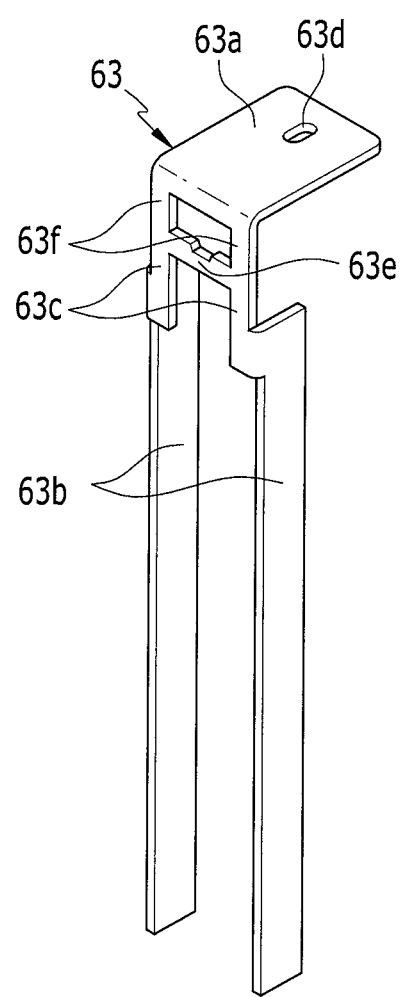
FIG. 7 is a perspective view of a first current collecting member according to a third example embodiment of the present invention.
Figure 8:
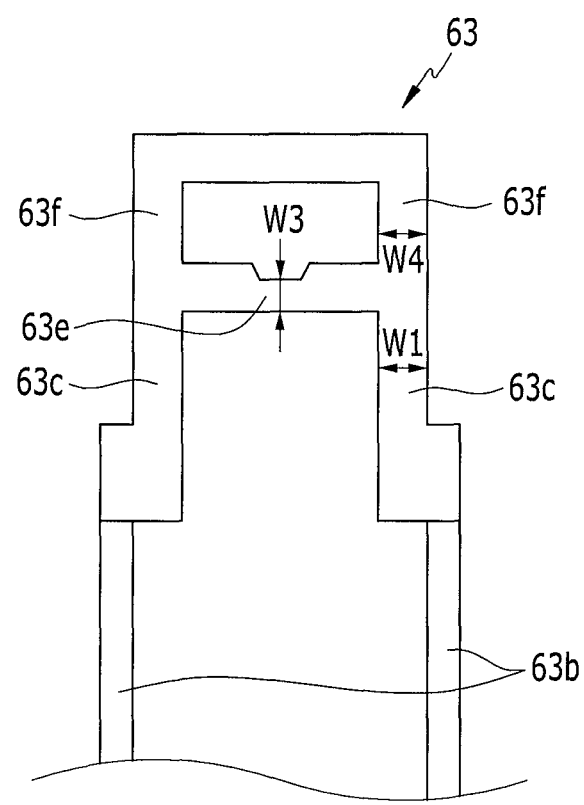
FIG. 8 is a side view of the first current collecting member according to the third example embodiment of the present invention.

FIG. 7 is a perspective view of a first current collecting member according to a third example embodiment of the present invention, and FIG. 8 is a side view of the first current collecting member according to the third example embodiment of the present invention.

Referring to FIGS. 7 and 8, because a rechargeable battery according to the present example embodiment has the same or substantially the same structure as the first example embodiment described above, except for a structure of a first current collecting member 63, a repeated description of the structure may be omitted.

The first current collecting member 63 includes a terminal connection portion 63a coupled to (e.g., bonded to) the connecting terminal 25 and electrode connection portions 63b extending from the terminal connection portion 63a towards the bottom of the case 26.

The terminal connection portion 63a has a quadrangular plate shape and is coupled to (e.g., fixed to) the bottom of the connecting terminal 25 by, for example, welding.

A fastening opening 63d (e.g., a fastening hole) is formed in the terminal connection portion 63a, and the terminal connection portion 63a is welded to the connecting terminal 25 while the protrusion formed at the bottom of the connecting terminal 25 is inserted into (e.g., fitted into) the fastening opening 63d.

Two electrode assemblies 10 are disposed in parallel with each other in the case 26, and the first current collecting member 63 is provided with two electrode connection portions 63b.

The electrode connection portions 63b are bent from a first fuse portion 63c to be coupled to (e.g., bonded to) the positive electrode uncoated region 11a while being disposed in parallel therewith.

The electrode connection portions 63b are respectively coupled to (e.g., bonded to) the positive electrode uncoated regions 11a of the different electrode assemblies 10 by, for example, welding.

The first fuse portions 63c are formed between (e.g., extend between) the electrode connection portions 63b and the terminal connection portion 63a such that they are melted faster than respective peripheral regions when an overcurrent flows.

The first fuse portions 63c are bent from the terminal connection portion 63a to protrude towards the bottom of the case 26.

The two first fuse portions 63c are formed at the terminal connection portion 63a, and the first fuse portions 63c have smaller cross-sections than the respective peripheral regions.

The electrode connection portions 63b are coupled to the terminal connection portion 63a through the first fuse portions 63c, and each of the first fuse portions 63c is coupled to each of the electrode connection portions 63b.

The first fuse portions 63c are disposed in series with (e.g., in line with) the electrode connection portions 63b.

A third fuse portion 63e is formed to couple the first fuse portions 63c to each other such that it extends in a crossing direction of the first fuse portions 63c (e.g., the third fuse portion 63e extends between the first fuse portions 63c).

The third fuse portion 63e is coupled to lateral ends of the first fuse portions 63c such that it electrically couples the first fuse portions 63c to each other.

The third fuse portion 63e is disposed above the first fuse portions 63c, and the first fuse portions 63c are disposed closer to the electrode connection portions 63b than the third fuse portion 63e is. Fourth fuse portions 63f are formed between the first fuse portions 63c and the terminal connection portion 63a such that they are disposed in series to be coupled with the first fuse portions 63c.

The first fuse portions 63c are coupled to the terminal connection portion 63a through the fourth fuse portions 63c, and each of the fourth fuse portions 63f is coupled to each of the first fuse portion 63c.

The fourth fuse portions 63f are disposed above the first fuse portions 63c, and the third fuse portion 63e is disposed between the fourth fuse portions 63f and the first fuse portions 63c.

In addition, the first fuse portions 63c are disposed closer to the electrode connection portions 63b than the fourth fuse portions 63f is.

A width W4 of each of the fourth fuse portions 63f is smaller than a width W1 of each of the first fuse portions 63c.

In addition, a width W3 of the third fuse portion 63e (e.g., a width of a portion of the third fuse portion 63e) is smaller than the width W1 of the first fuse portion 63c.

Accordingly, the third and fourth fuse portions 63e and 63f are melted faster than the first fuse portion 63c.

When an internal short-circuit occurs in one of the electrode assemblies 10, a short-circuit current flows from the other electrode assembly 10 to the short-circuited electrode assembly 10.

The short-circuit current flows through the first fuse portions 63c and the electrode connection portions 63b, and the first fuse portions 63c are melted when the short-circuit current flows.

However, when the first fuse portion 63c is not completely melted, the current flows through the third fuse portion 63e, and in this case, the third fuse portion 63e is melted.

Moreover, the short-circuit current flows through the fourth fuse portions 63f after the third fuse portion 63e is melted, and the fourth fuse portions 63f are melted as a result.

When an external short-circuit occurs, the current flows through the first fuse portions 63c and the fourth fuse portions 63f, and the fourth fuse portions 63f are melted due to the short-circuit current.

Thus, the short-circuit current may be stably cut off.

Figure 9:
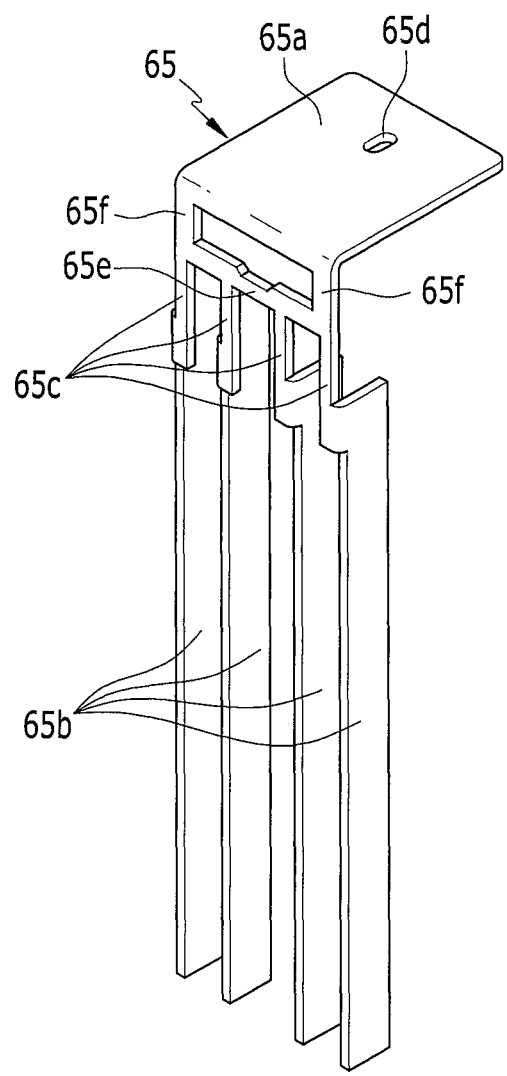
FIG. 9 is a perspective view of a first current collecting member according to a fourth example embodiment of the present invention.
Figure 10:
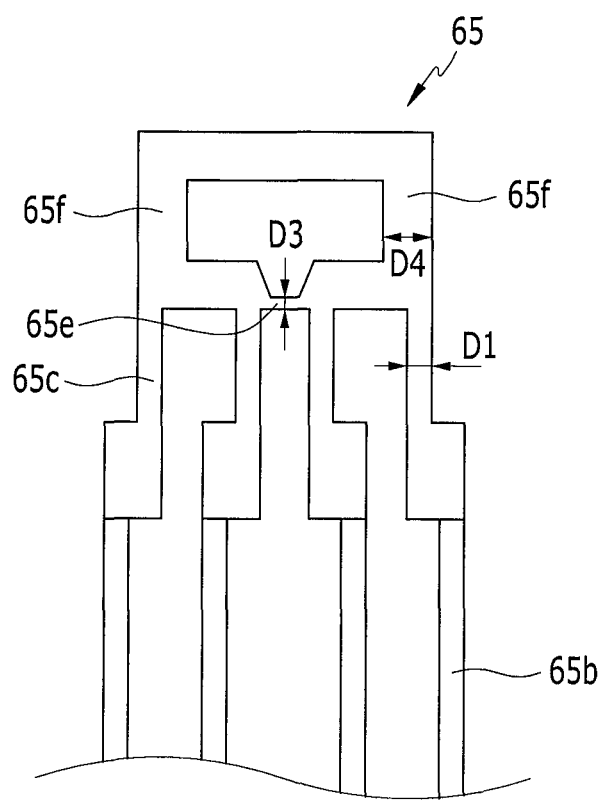
FIG. 10 is a side view of the first current collecting member according to the fourth example embodiment of the present invention.

FIG. 9 is a perspective view of a first current collecting member according to a fourth example embodiment of the present invention, and FIG. 10 is a side view of the first current collecting member according to the fourth example embodiment of the present invention.

Referring to FIGS. 9 and 10, because a rechargeable battery according to the present example embodiment has the same or substantially the same structure as the first example embodiment described above, except for a structure of a first current collecting member 65 and a number of electrode assemblies 10 placed in the case, a repeated description of the structure may be omitted.

Because a second current collecting member has the same or substantially the same structure as a first current collecting member 65, a description of the second current collecting member may be omitted.

Four electrode assemblies 10 are placed in the case 26, and the electrode assemblies 10 are disposed in parallel (e.g., arranged) such that their flat frontal sides face each other.

The first current collecting member 65 includes a terminal connection portion 65a coupled to (e.g., bonded to) the connecting terminal 25 and electrode connection portions 65b extending from the terminal connection portion 65a toward the bottom of the case 26.

The terminal connection portion 65a has a quadrangular plate shape and is coupled to (e.g., fixed to) the bottom side of the connecting terminal 25 by, for example, welding.

A fastening opening 65d (e.g., a fastening hole) is formed in the terminal connection portion 65a, and the terminal connection portion 65a is welded to the connecting terminal 25 while the protrusion formed at the bottom of the connecting terminal 25 is inserted into (e.g., fitted into) the fastening opening 65d.

The first current collecting member 65 has four electrode connection portions 65b, and the four electrode connection portions 65b are coupled to the respective different electrode assemblies 10.

The electrode connection portions 65b are bent from first fuse portions 65c to be coupled to (e.g., bonded to) the positive electrode uncoated region 11a while being disposed in parallel therewith.

The electrode connection portions 65b are respectively coupled to (e.g., bonded to) the positive electrode uncoated regions 11a of the different electrode assemblies 10 by, for example, welding.

The first fuse portions 65c are formed between the electrode connection portions 65b and the terminal connection portion 61a such that they are melted faster than respective peripheral regions when an overcurrent flows.

The first fuse portions 65c are bent from the terminal connection portion 65a to protrude towards the bottom of the case 26.

The four first fuse portions 65c are formed at the terminal connection portion 65a, and the first fuse portions 65c have smaller cross-sections than the respective peripheral regions.

The electrode connection portions 65b are coupled to the terminal connection portion 65a through the first fuse portions 65c, and each of the first fuse portions 65c is coupled to each of the electrode connection portions 65b.

The first fuse portions 65c are disposed in series with (e.g., in line with) the electrode connection portions 65b.

A third fuse portion 65e is formed to couple the first fuse portions 65c to each other such that it extends in a crossing direction of the first fuse portions 65c (e.g., the third fuse portion 65e extends between each of the first fuse portions 65c).

The third fuse portion 65e is coupled to lateral ends of the first fuse portions 65c such that it electrically couples the first fuse portions 65c to each other.

The third fuse portion 65e is disposed above the first fuse portions 65c, and the first fuse portions 65c are disposed closer to the electrode connection portions 65b than the third fuse portion 65e is.

Two fourth fuse portions 65f are formed at the terminal connection portion 65a such that they are disposed between the first fuse portions 65c and the terminal connection portion 65a.

Accordingly, the first current collecting member 65 has more first fuse portions 65c than it has fourth fuse portions 65f (e.g., the first current collecting member 65 may include a greater number of first fuse portions 65c than fourth fuse portions 65f).

The fourth fuse portions 65f are disposed above the first fuse portions 65c, and the third fuse portion 65e is disposed between the first and fourth fuse portions 65f and 65c.

In addition, the first fuse portions 65c are disposed closer to the electrode connection portions 65b than the fourth fuse portions 65f is.

A width D4 of each of the fourth fuse portions 65f is greater than a width D1 of each of the first fuse portions 65c, and the width D4 of each of the fourth fuse portion 65f is less than two times the width D1 of each of the first fuse portions 65c.

A width D3 of the third fuse portion 65e (e.g., a width of a portion of the third fuse portion 65e) is less than the width D1 of each of the first fuse portions 65c.

Accordingly, the third fuse portion 65e is melted faster than the first fuse portions 65c when an overcurrent flows.

When an internal short-circuit occurs in one of the electrode assemblies 10, the short-circuit current flows from the other electrode assemblies 10 to the short-circuited electrode assembly 10.

The short-circuit current flows through the first fuse portions 65c and the electrode connection portions 65b, and the first fuse portions 65c are melted when the short-circuit current flows.

However, when the first fuse portions 65c are not completely melted, the current flows through the third fuse portion 65e, and in this case, the third fuse portion 65e is melted.

Moreover, the short-circuit current flows through the fourth fuse portions 631 after the third fuse portion 65e is melted, and the fourth fuse portions 65f are melted as a result.

Once the third fuse portion 65e melts, each of the fourth fuse portions 65f become coupled to only two of the first fuse portions 65c, and two times more current flows through the fourth fuse portions 65f than through each of the first fuse portions 65c.

Thus, the fourth fuse portions 651 may be easily melted, thereby complementing the first fuse portions 65c even when the fourth fuse portions 65f are formed larger (e.g., thicker) than the first fuse portions 65c.

Figure 11:
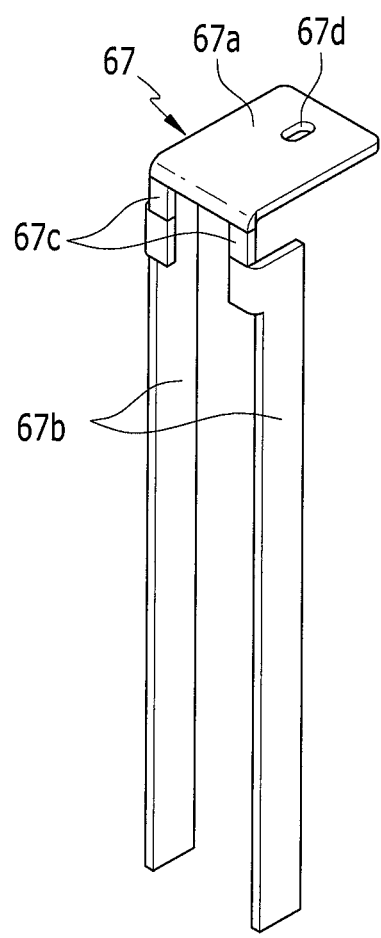
FIG. 11 is a perspective view of a first current collecting member according to a fifth example embodiment of the present invention.

FIG. 11 is a perspective view of a first current collecting member according to a fifth example embodiment of the present invention.

Referring to FIG. 11, because a rechargeable battery according to the present example embodiment has the same or substantially the same structure as the first example embodiment described above, except for a structure of a first current collecting member, a repeated description of the structure may be omitted.

A first current collecting member 67 includes a terminal connection portion 67a coupled to (e.g. bonded to) the connecting terminal 25 and electrode connection portions 67b extending from the terminal connection portion 67a towards the bottom of the case 26.

The terminal connection portion 67a has a quadrangular plate shape and is coupled to (e.g., fixed to) the bottom of the connecting terminal 25 by, for example, welding.

A fastening opening 67d (e.g., a fastening hole) is formed in the terminal connection portion 67a, and the terminal connection portion 67a is welded to the connecting terminal 25 while the protrusion formed at the bottom of the connecting terminal 25 is inserted into (e.g., fitted into) the fastening opening 67d.

Two electrode assemblies 10 are disposed in parallel with each other in the case 26, and the first current collecting member 67 is provided with two electrode connection portions 67b.

The electrode connection portions 67b are bent from first fuse portions 67c to be coupled to (e.g., bonded to) the positive electrode uncoated region 11a while being disposed in parallel therewith.

The electrode connection portions 67b are respectively coupled to (e.g., bonded to) the positive electrode uncoated regions 11a of the different electrode assemblies 10 by, for example, welding.

The first fuse portions 67c are formed between the electrode connection portions 67b and the terminal connection portion 67a such that they are melted faster than respective peripheral regions when an overcurrent flows.

The first fuse portions 67c are bent from the terminal connection portion 67a to protrude towards the bottom of the case 26.

The two first fuse portions 67c are formed at the terminal connection portion 67a and are made of a material having a lower melting point than the respective peripheral regions.

While this invention has been described in connection with what is presently considered to be practical example embodiments, it is to be understood that the invention is not limited to the disclosed embodiments but is intended to cover various modifications and equivalent arrangements included within the spirit and scope of the appended claims and their equivalents.

Description of Reference Symbols

| | |
|---|---|
| 101: rechargeable battery | 10: electrode assembly |
| 11: positive electrode (first electrode) | 11a: positive electrode uncoated region |
| 12: negative electrode (second electrode) | 12a: negative electrode uncoated region |
| 13: separator | 21: first terminal |
| 22: second terminal | 25: connection terminal |
| 26: case | 30: cap assembly |
| 31: cap plate | 32: electrolyte injection opening |
| 34: vent opening | 37: short-circuit opening |
| 38: sealing cap | 39: vent plate |
| 41, 61, 63, 65, 67: first current collecting member | |
| 41a, 42a, 61a, 62a, 63a, 65a, 67a: terminal connection portion | |
| 41b, 42b, 61b, 62b, 63b, 65b, 67b: electrode connection portion | |
| 41c, 42c, 61c, 62c, 63c, 65c, 67c: first fuse portion | |
| 41d, 42d, 61d, 62d, 63d, 65d, 67d: fastening opening | |
| 42: second current collecting member | |
| 43: lower insulation member | |
| 45: lower insulation member | 54: upper insulation member |
| 55: sealing gasket | 56: short-circuit member |
| 58: connection member | 59: sealing gasket |
| 61e, 62e: second fuse portion | 63e, 65e: third fuse portion |
| 63f, 65f: fourth fuse portion | |

What is claimed is:

1. A rechargeable battery comprising:
   a plurality of electrode assemblies each comprising a first electrode and a second electrode;
   a case accommodating the electrode assemblies;
   a cap assembly coupled to the case and comprising a terminal; and
   a first current collector coupling the terminal with the first electrodes of the electrode assemblies, the first current collector comprising:
   a terminal connector coupled to the terminal;
   a plurality of electrode connectors, each of the electrode connectors being coupled to a respective one of the first electrodes;
   a plurality of first fuses, each of the first fuses being between the terminal connector and a respective one of the electrode connectors and having a substantially constant cross section between the terminal connector and the respective one of the electrode connectors; and
   a second fuse coupling the electrode connectors to each other and being located between the electrode connectors.

2. The rechargeable battery of claim 1, wherein the first fuses and the second fuse are configured to melt in sequence when an overcurrent flows.

3. The rechargeable battery of claim 1, wherein the second fuse is closer to the electrode connectors than each of the first fuses is to the electrode connectors.

4. The rechargeable battery of claim 3, wherein the second fuse couples the electrode connectors to each other.

5. A rechargeable battery comprising:
   a plurality of electrode assemblies each comprising a first electrode and a second electrode;
   a case accommodating the electrode assemblies;
   a cap assembly coupled to the case and comprising a terminal; and
   a first current collector coupling the terminal with the first electrodes of the electrode assemblies, the first current collector comprising:
   a terminal connector coupled to the terminal;
   a plurality of electrode connectors, each of the electrode connectors being coupled to a respective one of the first electrodes;
   a plurality of first fuses, each of the first fuses being between the terminal connector and a respective one of the electrode connectors and having a substantially constant cross section between the terminal connector and the respective one of the electrode connectors; and
   a third fuse between the first fuses,
   wherein the first fuses are coupled to each other through the third fuse, and each of the first fuses is closer to the electrode connectors than the third fuse is to the electrode connectors.

6. The rechargeable battery of claim 5, wherein the third fuse extends between the first fuses to couple lateral ends of the first fuses to each other.

7. The rechargeable battery of claim 5, wherein the first current collector further comprises a plurality of fourth fuses coupled to the terminal connector, and the first fuses are electrically coupled to the terminal connector through the fourth fuses.

8. The rechargeable battery of claim 7, wherein the first fuses are coupled to the fourth fuses.

9. The rechargeable battery of claim 7, wherein the third fuse has a width smaller than that of each of the first fuses.

10. The rechargeable battery of claim 7, wherein each of the fourth fuses is coupled to each of the electrode connectors, and each of the fourth fuses has a width smaller than that of each of the first fuses.

11. The rechargeable battery of claim 7, wherein the third fuse and the fourth fuses are configured to melt before the first fuses when an overcurrent flows.

12. The rechargeable battery of claim 7, wherein the first current collector comprises a greater number of first fuses than fourth fuses, and each of the fourth fuses has a width greater than that of each of the first fuses.

13. The rechargeable battery of claim 12, wherein the width of each of the fourth fuses is less than two times the width of each of the first fuses.

14. The rechargeable battery of claim 12, wherein a width of the third fuse is less than the width of each of the first fuses.

15. The rechargeable battery of claim 12, wherein a width of the third fuse at a center region of the third fuse is less than a width of the third fuse outside the center region.

* * * * *